(12) United States Patent
Gonzales et al.

(10) Patent No.: US 10,292,561 B2
(45) Date of Patent: May 21, 2019

(54) CLEANING IMPLEMENT COMPRISING HYBRID FOAM

(71) Applicant: The Procter & Gamble Company, Cincinnati, OH (US)

(72) Inventors: Denis Alfred Gonzales, Brussels (BE); Geert Andre Deleersnyder, Wielsbeke (BE); Peter Nessel, Ludwigshafen (DE); Tobias Heinz Steinke, Speyer (DE)

(73) Assignee: The Procter & Gamble Company, Cincinnati, OH (US)

( * ) Notice: Subject to any disclaimer, the term of this patent is extended or adjusted under 35 U.S.C. 154(b) by 379 days.

(21) Appl. No.: 14/993,239

(22) Filed: Jan. 12, 2016

(65) Prior Publication Data

US 2016/0166128 A1 Jun. 16, 2016

Related U.S. Application Data (63) Continuation of application No. 13/053,543, filed on Mar. 22, 2011, now abandoned.

(30) Foreign Application Priority Data

Mar. 25, 2010 (EP) .................................. 10157806
Feb. 23, 2011 (EP) .................................. 11155591

(51) Int. Cl.
*A47L 13/16* (2006.01)
*A47L 13/17* (2006.01)
(Continued)

(52) U.S. Cl.
CPC .............. *A47L 13/16* (2013.01); *A47L 13/17* (2013.01); *B32B 5/18* (2013.01); *B32B 5/245* (2013.01); *B32B 5/32* (2013.01); *B32B 7/08* (2013.01); *B32B 7/12* (2013.01); *B32B 27/36* (2013.01); *B32B 27/38* (2013.01); *B32B 27/40* (2013.01); *B08B 1/00* (2013.01); *B08B 1/002* (2013.01); *B32B 2266/02* (2013.01); *B32B 2266/025* (2013.01); *B32B 2266/0278* (2013.01); *B32B 2266/0285* (2013.01); *B32B 2266/06* (2013.01);
(Continued)

(58) Field of Classification Search
CPC .......... A47L 13/00; A47L 13/10; A47L 13/16; A47L 13/17; B08B 1/00; B08B 1/001; B08B 1/006
See application file for complete search history.

(56) References Cited

U.S. PATENT DOCUMENTS 6,503,615 B1 * 1/2003 Horii ....................... A47L 13/16
428/316.6
6,608,118 B2 8/2003 Kosaka et al.
(Continued)

FOREIGN PATENT DOCUMENTS

EP 1 600 096 A2 11/2005
JP 2002-317366 * 10/2002
(Continued)

OTHER PUBLICATIONS

Partial machine translation of JP 2002-355211, Dec. 10, 2002.*

*Primary Examiner* — Mark Spisich
(74) *Attorney, Agent, or Firm* — John T. Dipre (57) ABSTRACT

The present invention relates to a cleaning implement comprising hybrid foam and to a method of cleaning a hard surface with said cleaning implement.

9 Claims, 1 Drawing Sheet

(51) Int. Cl.
  *B32B 5/18* (2006.01)
  *B32B 5/24* (2006.01)
  *B32B 5/32* (2006.01)
  *B32B 7/08* (2019.01)
  *B32B 7/12* (2006.01)
  *B32B 27/36* (2006.01)
  *B32B 27/38* (2006.01)
  *B32B 27/40* (2006.01)
  *B08B 1/00* (2006.01)

(52) U.S. Cl.
  CPC ..... *B32B 2270/00* (2013.01); *B32B 2307/732* (2013.01); *B32B 2432/00* (2013.01)

(56) References Cited

U.S. PATENT DOCUMENTS

| | | |
|---|---|---|
| 7,629,043 B2 | 12/2009 | Lindsay et al. |
| 2005/0136238 A1 | 6/2005 | Lindsay et al. |
| 2005/0202232 A1 | 9/2005 | Sauniere |
| 2005/0266229 A1* | 12/2005 | Porticos ............ B32B 5/18 428/317.9 |
| 2005/0266230 A1 | 12/2005 | Hill et al. |
| 2006/0005338 A1* | 1/2006 | Ashe ............ A47L 13/16 15/244.4 |
| 2007/0017053 A1* | 1/2007 | Chen ............ A47L 13/16 15/244.3 |
| 2007/0061991 A1 | 3/2007 | Gonzales et al. |
| 2007/0157948 A1* | 7/2007 | Gonzales ............ A47L 13/16 134/6 |
| 2007/0161533 A1 | 7/2007 | Gonzales |
| 2009/0145459 A1 | 6/2009 | Gonzales |
| 2010/0257685 A1 | 10/2010 | Tuman |
| 2012/0090120 A1* | 4/2012 | Tuman ............ A47L 13/16 15/209.1 |

FOREIGN PATENT DOCUMENTS

| | | |
|---|---|---|
| JP | 2002-355211 * | 12/2002 |
| WO | WO-2001/094436 A2 | 12/2001 |
| WO | WO 2007/080553 A2 | 7/2007 |
| WO | WO-2009/077616 A1 | 6/2009 |

* cited by examiner

CLEANING IMPLEMENT COMPRISING HYBRID FOAM

CROSS REFERENCE TO RELATED APPLICATION

This application is a continuation of application Ser. No. 13/053,043, filed Mar. 22, 2011, now abandoned.

FIELD OF THE INVENTION

The present invention relates to a cleaning implement comprising hybrid foam.

BACKGROUND OF THE INVENTION

Open-cell foams and in particular melamine-formaldehyde resin foams (also referred to herein as melamine foams) are well known in the art for use in industrial applications, for example, as heat or sound insulating materials as well as for fire protection purposes. Indeed, in the automotive industry, open-cell foams are commonly used to insulate motor compartments and driver cabins of cars and trucks.

Recently, a novel application for such open-cell foams in the area of hard surface cleaning has been discovered. Indeed, cleaning implements of cut or molded pieces of such open-cell foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that open-cell foam (and melamine foam in particular) shows good soil and/or stain removal performance when used to clean hard surfaces, on stains/soils such as marks on walls and furniture. Indeed, it has been observed that open-cell foams (and melamine foam in particular) when wetted with an appropriate solvent, such as tap water, removes soils and/or stains from a hard surface when said hard surface is brought into contacted with said wetted modified open-cell foam. By "bringing into contact" it is meant wiping, swiping, rubbing or the like. In order for the open-cell foam (and melamine foam in particular) to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the open-cell foam (and melamine foam in particular) comes off as small particles (meaning, the foam crumbles) when brought into contact with a hard surface. Indeed, a milky suspension of small modified open-cell foam (and melamine foam in particular) particles in water is formed. However there has been need for better soil and/or stain removal with better durability upon use.

It is therefore, an objective of the present invention to provide a cleaning implement based on new hybrid foam, wherein said implement is capable of (improved) cleaning greasy soap scum soils and neat kitchen dirt (grease) from hard surfaces and at the same time shows excellent durability upon use.

It has now been found that the above objective can be met by the use of hybrid foam according to the present invention to clean hard surfaces. Indeed, the objectives are met by the cleaning implement according to the present invention comprising such hybrid foam, the method of cleaning hard surfaces with such a cleaning implement or the method of cleaning hard surfaces with the inventive foams.

SUMMARY OF THE INVENTION

The present invention relates to a cleaning implement (1) comprising a hybrid foam (2) wherein said hybrid foam comprises a melamine formaldehyde resin as foamable reactive resins, and a substrate material, wherein said substrate material is selected from the group consisting of mineral fibres, animal fibres, plant fibres, chemical fibres, natural fibres, synthetic fibres, fibers of nonwoven fabrics, fibres of woven materials and mixtures thereof.

The present invention further encompasses a method of cleaning a hard surface with a cleaning implement according to the present invention.

DESCRIPTION OF THE REFERENCE NUMERALS

1: Cleaning implement
2: Hybrid foam layer
3: Layer of second foam.
4: Line indicating the separation of the two layers

DETAILED DESCRIPTION OF THE INVENTION

Cleaning Implement

The cleaning implement (1) herein comprises hybrid foam as described herein below.

By a "cleaning implement" it is meant herein an article of manufacture of any suitable shape and/or size and/or volume suitable for cleaning, i.e., removing spots and/or stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

In a preferred embodiment, the cleaning implements herein are suitable for cleaning/cleansing inanimate surfaces selected from the group consisting of household hard surfaces; dish surfaces; surfaces like leather or synthetic leather; and automotive vehicles surfaces.

In a highly preferred embodiment, the cleaning implements herein are suitable to clean household hard surfaces.

By "household hard surface", it is meant herein any kind of surface typically found in and around houses like kitchens, bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, Inox®, Formica®, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

Suitable shapes of the cleaning implements (1), such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from 1 $cm^3$ to 10,000 $cm^3$, preferably from 10 $cm^3$ to 1,000 $cm^3$, more preferably from 150 $cm^3$ to 250 $cm^3$.

In a highly preferred embodiment herein, the cleaning implement (1) herein has a cuboid shape defined by three groups of parallel and equal length sides, referred to as a, b and c, wherein a ranges from 2 cm to 20 cm, preferably 4 cm to 8 cm, b ranges from 2 cm to 20 cm preferably 8 cm to 15 cm, and c ranges from 1.5 cm to 5 cm, preferably 2 cm to 4 cm.

In a preferred embodiment, the thickness of said hybrid foam (2) layer is from 5 mm to 100 mm, preferably from 7 mm to 50 mm, more preferably 10 mm to 50 mm even more preferably from 15 mm to 50 mm, still more preferably from 20 mm to 40 mm.

Figure 1:
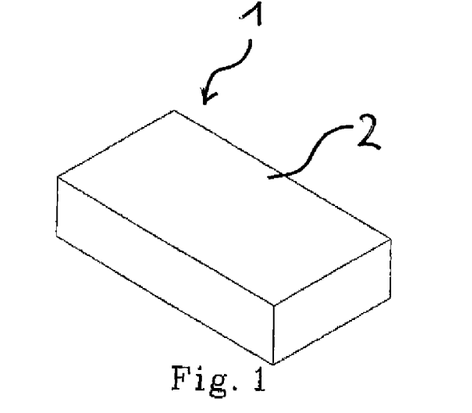
FIG. 1 is a perspective view of a cleaning implement (1).

The cleaning implement (1) of a first embodiment of the present invention as shown in FIG. 1 comprises a single layer (2) of hybrid foam.

In a preferred embodiment according to the present invention the cleaning implements herein may comprise additional layers of material. Preferably, in the cleaning implement herein said hybrid foam (2) forms a first layer and said cleaning implement additionally comprises a second layer of material. Even more preferably, said second layer of material is a second foam layer (3) made of a second foam material as discussed herein below. Such a cleaning implement according to this preferred embodiment is shown in FIG. 2.

The layers of hybrid foam (2) and second foam (3) may be arranged in said cleaning implement in any way suitable. In a preferred embodiment the layers of hybrid foam (2) and second foam (3) are arranged parallel to at least one side, preferably two opposite sides, of the cleaning implement. However, the cleaning implement may also have an irregular shape. Indeed, the thickness of the layers may be constant or vary throughout the cleaning implement. The separation line (4) between the two layers may form a straight line or may form a bend or be completely irregular. In addition, the separation plane of the layers may be in the center of cleaning implement, dividing the implement in two equal parts, or may be in the upper or lower part of the implement. In addition, the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

Figure 2:
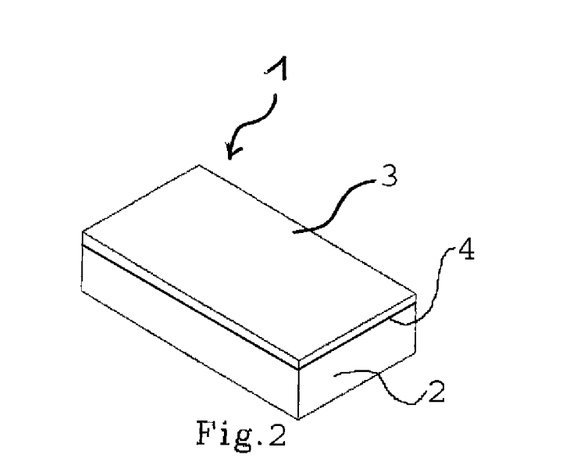
FIG. 2 is a perspective view of a cleaning implement (1) comprising two layers.

In this highly preferred embodiment, wherein the cleaning implement (1) herein has a cuboid shape, the line indicating the separation (4) of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention present invention, the hybrid foam layer (2) and the second layer of a second foam (3) have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the hybrid foam herein or the second foam herein) over an open flame, which creates a thin layer of molten foam/polymer. Second foam (either the second foam herein or the hybrid foam herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if any, may be of the same or similar materials as the hybrid foam or said second foam, or may be made of another material having similar properties as said second foam or different properties therefore. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is hybrid foam with the second outer layer being either hybrid foam or another material providing other feature, such as abrasiveness or increased rigidity. In a highly preferred embodiment according to the present invention the cleaning implement herein comprises two outer layers of said hybrid foam (a) and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said hybrid foam to said second foam in the cleaning implement according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In order to obtain suitable cleaning implements according to the present invention, the hybrid foam- and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Hybrid Foam

By "hybrid foam" it is meant herein foams produced from 3-dimensional and 2-dimensional substrate material and foamable melamine formaldehyde resin. Optionally, two or more different foamable reactive resins can also be incorporated into the substrate material.

The cleaning implement (1) herein comprises hybrid foam (2).

The weight ratio of substrate material to foaming reactive resin as a general rule is from 1 to 50% by weight, preferably from 5 to 30% by weight, in particular from 10 to 20% by weight.

Suitable substrate materials for the hybrid foams according to the invention are all the 3-dimensional and 2-dimensional materials known to the person skilled in the art, which can be used as substrate, matrix or skeletal structure/framework. In principle, substrate material can be designed to be any shape or thickness. Preferably, 2-dimensional substrate materials are used which are planar, wherein the third dimension (thickness) is smaller than the first (length) and second (width) dimensions of the planar substrate material. The length and width of the planar substrate material can be the same or different. Suitable substrates used herein are preferably air permeable allowing melamine foaming additionally substrates have preferably open cell structure.

Preferably, the substrate materials are selected from at least one (foaming) polyurethane resin (PU resin), (foaming) polyester resin or (foaming) epoxy resin. Preferably the substrate material is a polyurethane resin. Suitable polyurethane resins used herein are polyester resins or epoxy resins. By way of example, such resins can be found in the *Encyclopedia of Polymer Science and Technology* (Wiley) in the following chapters: a) Polyesters, unsaturated: Edition 3, Vol. 11, 2004, pages 41-64; b) Polyurethanes: Edition 3, Vol. 4, 2003, pages 26-72; and c) Epoxy Resins: Edition 3, Vol. 9, 2004, pages 678-804. In addition, the following chapters are found in *Ullmann's Encyclopedia of Industrial Chemistry* (Wiley): a) Polyester resins, unsaturated: Edition 6, Vol. 28, 2003, pages 65-74; b) Polyurethanes: Edition 6, Vol. 28, 2003, pages 667-722; and c) Epoxy Resins: Edition 6, Vol. 12, 2003, pages 285-303.

Polyurethane resins in the context of the present invention are understood in particular to be resins based on polyurethane. They are preponderantly derived from drying oils (triglycerides, unsaturated fatty acids), which are first transesterified with glycerol to a mixture of mono and diglycerides. The resulting products are subsequently converted to polyurethanes with diisocyanates, preferably diisocyanatol toluene, with a material quantity ratio of isocyanate groups: hydroxy groups of 1:1, which no longer contain isocyanate groups and dry out and harden by air oxidation, like alkyd resins. Alternatively, they can be produced from polyalcohols partially esterified with unsaturated acids (e.g. with tall oil) (glycerol, pentaerythritol) and diisocyanates.

Polyester resins in the context of the present invention are understood to be preferably unsaturated polyester resins. In particular, the polyester resins are reaction resins based on unsaturated polyesters, produced from unsaturated dicarboxylic acids such as maleic acid or fumaric acid, and predominantly divalent alcohols, such as ethylene glycol and propane-1,2-diol, which solidify into thermosetting masses when used with polymerization and cross linking. During their manufacture, copolymerizable monomers (styrene, α-methyl styrene, vinyl toluene, methyl methacrylate and others) as solvents or diluting agents, bifunctional monomers (e.g., divinyl benzene, diallyl phthalate) as cross linking agents and hardening agent (initiators of polymerization, e.g. peroxide), activators, pigments, softeners, antistatic agents, bulking agents and reinforcing agents (inorganic or organic fibers) can be used.

Epoxy resins in the context of the present invention are understood to be preferably both oligomeric compounds having more than one epoxy group per molecule, which are used in the manufacture of thermosetting resins, and the corresponding thermosetting resins themselves. The conversion of the epoxy resin into a thermosetting resin takes place by means of poly addition reactions with suitable resins or by means of polymerization with the epoxy groups. Preferably the manufacture of epoxy resins results from the conversion in an alkaline medium of bisphenol A (aromatic dihydroxy compounds) with epichlorohydrin into linked compounds.

The polymeric foam materials have preferably open cell structure. In this connection, the conventional closed cell foam structures are subsequently treated/reticulated.

What is known as reticulation is a process, in which the cell membranes of a foam material are removed, so that the foam material becomes open celled.

Reticulation is carried out by enclosing the entire foam material either as blocks or rolls having a diameter of approximately 1 m in reactors. Firstly the air is then pumped out and replaced with a combustible gas. By igniting the gas mixture, the thinnest structures in the foam, the cell membranes, are ruptured by the wave of heat and pressure and melt onto the cell walls, making them thicker. Through reticulation, the compression load deflection of the foam block is reduced by approximately 20%, whereas, in contrast, the tensile strength and strain value increase.

Reticulation creates a high interior temperature in the block, similar to after the foaming Therefore, a cooling down time is necessary after reticulation. Reticulated foams are nearly 100% open celled and therefore have a minimal flow resistance to gases or liquids. The most frequent use is in filters of all kinds. In the present invention, with the help of the reticulation process, the selected foam is thereby refined so that it has less than 20 pores per centimeter, preferably less than 8 pores per centimeter and most preferably less than 4 pores per centimeter.

Alternatively, or in addition to the process of reticulation, there is the possibility of reducing the density of the foam through mechanical treatment which introduces additional holes or spaces into the foam, in addition to the pores already present in the foam.

Suitable additional substrate materials used in hybrid foams are mineral fibers (e.g. glass, mineral wool, basalt), animal fibers (e.g. silk, wool) vegetal fibers (e.g. cotton), chemical fibers from natural polymers (e.g. cellulose), and chemical fibers from synthetic polymers, such as polyamide (PA 6.6—brand name—nylon, PA 6.0—brand name—perlon), polyester (PET (polyethylene terephthalate), PBT (polybutylene terephthalate), PVC (polyvinylchloride), PP (polypropylene), PE (polyethylene), PPS (polyphenylene sulfide), PAN (polyacrylnitrile), PI (polyimide), PTFE (polytetrafluoroethylene, Teflon) aramide (meta-aramide, brand name, for example, Nomex, para amide, brand name, for example, Kevlar), polyamideimide (Kermel). (*Ullmann's Encyclopedia of Industrial Chemistry*, Chapter 13, Fibers, 2003, pages 323 to 652.)

Preferably nonwoven and woven materials are used, as well as two- and three-dimensional open cell networks made of the above named fibers.

Fiber blends of the above named fibers can also be used as substrate materials. Multi-layered fabrics made of materially similar fibers of varying density and fabric weights can be used. In like manner, multi-layered fabrics made of different kinds of fibers of the same density or different densities or the same thickness or different thicknesses can be used.

Suitable as foamable reactive resins are melamine-formaldehyde resins, particularly preferred melamine-formaldehyde resins which produce an open cell foam with a density of ≤25 g/l, that is, 1.6 to 25 g/l, preferably 2 to 15 g/l, especially preferred 3 to 23 g/l, in particular 4 to 12 g/l and/or a pore size between 10 and 1000 μm, preferably 50 and 300 μm.

Methods for producing melamine-formaldehyde resins and their foams are known from WO-A-01/94436.

The hybrid foams according to the present invention are produced as follows:
1. A solution or dispersion is produced, comprising a precondensate of the foam material to be produced and optionally further additional components. E.g.: The melamine-formaldehyde resins capable of forming foam
2. The precondensate is poured on the substrate material and is foamed by heating and optionally with the help of foaming agent, to a temperature higher than the boiling point of the foaming agent, in order to obtain a foam material,
3. and preferably optionally, the foam material obtained in step (2) is dried.

The individual production steps and the different possibilities for variations are described in more detail below.

The melamine-formaldehyde precondensates, as a general rule, have a molar ratio of formaldehyde to melamine of 5:1 to 1.3:1, preferably 3.5:1 to 1.5:1.

Besides melamine, these melamine-formaldehyde condensation products can contain other thermosetting builders, up to 50% by weight, preferably up to 20% by weight, and other condensed aldehydes besides formaldehyde up to 50% by weight, preferably up to 20% by weight. Preferably, however, it is an unmodified melamine-formaldehyde condensation product.

Thermosetting builders that can be used are, by way of example, alkyl and aryl substituted melamine, urea, urethanes, carboxylic acid amides, dicyandiamide, guanidine, sulfuryl amide, sulfonic acid amides, aliphatic amines, glycoles, phenol, and derivatives thereof.

Aldehydes that can be used are, by way of example, acetaldehyde, trimethylol acetaldehyde, acrolein, benzaldehyde, furfural, glyoxal, glutaraldehyde, phthalaldehyde and terephthalaldehyde. Additional details about melamine-formaldehyde condensation products are found in Houben-Weyl, *Methods of Organic Chemistry*, Volume 14/2, 1963, pages 319 through 402.

In a further preferred embodiment, the melamine-formaldehyde precondensate is present in the mixture in an amount of from 55 to 85%, preferably from 63 to 80% by weight.

Alcohols, for example, methanol, ethanol or butanol can be added during the production of the melamine-formaldehyde precondensate, in order to obtain a partially or fully etherified condensate.

The formation of ether groups can affect the solubility of the melamine-formaldehyde precondensates and the mechanical characteristics of the completely hardened material.

As a dispersing agent or emulsifier, anionic, cationic and nonionic surfactants and mixtures thereof can be used.

Suitable anionic surfactants, by way of example, are diphenylene oxide sulfonates, alkane and alkylbenzene sulfonates, alkyl naphthalene sulfonates, olefin sulfonates, alkyl ether sulfonates, fatty acid sulfates, ether sulfates, a-sulfo fatty acid ester, acylamino alkane sulfonates, acylisothionates, alkyl ether carboxylate, N-acylsarcosinates, alkyl phosphates and alkyl ether phosphates. As nonionic surfactants alkyl phenol polyglycol ether, fatty alcohol polyglycol ether, fatty acid polyglycol ether, fatty acid alkanolamines, ethylene oxide/propylene oxide block copolymers, aminoxides, glycerol fatty acid ester, sorbitan ester and alkyl polyglycosides can be used. As cationic emulsifiers, by way of example, alkyl triammonium salts, alkyl benzyl dimethyl ammonium salts and alkyl pyridinium salts can be used.

The dispersing agents and/or emulsifiers can be used in amounts of from 0.2 to 5% by weight, based on the melamine-formaldehyde precondensate.

In principle, the dispersing agents and/or emulsifiers and/or protective colloid can be added to the raw dispersion at any point in time; however, they can also already be present in the solvent when the micro capsule dispersion is introduced.

Acid compounds can be used as hardening agents, which catalyze the further condensation of the melamine resin. As a rule, the amount of this hardening agent is 0.01 to 20% by weight, preferably 0.05 to 5% by weight, in each case based on the precondensate. Suitable acid compounds are inorganic and organic acids selected, by way of example, from the group consisting of hydrochloric acid, sulfuric acid, phosphoric acid, nitric acid, formic acid, acetic acid, oxalic acid, toluene sulfonic acid, amido sulfonic acids, acid anhydrides and mixtures thereof.

The mixture contains a foaming agent, depending on the selection of the melamine-formaldehyde precondensate. In this connection, the amount of foaming agent in the mixture, as a general rule, corresponds to the desired density of the foam material.

In principle, both physical and chemical foaming agents can be used in the method according to the invention (*Encyclopedia of Polymer Science and Technology*, Vol. 1, $3^{rd}$ expanded, Chapter—Additives, pages 203 to 218, 2003).

"Physical" or "chemical" foaming agents are suitable as foaming agents. In this connection, "physical" foaming agents are understood to be volatile liquids or compressed gasses, which derive their properties as foaming agents from physical conditions (for example, from temperature, pressure). "Chemical" foaming agents are understood to be those foaming agents that derive their properties as foaming agents from chemical reactions or chemical transfer involving the release of gas.

Suitable "physical" foaming agents, by way of example, are hydrocarbons such as pentane, hexane, halogenated, in particular, chlorinated and/or fluorinated hydrocarbons, for example, methylene chloride, chloroform, trichloroethane, fluorochlorohydrocarbons, partially halogenated fluorochlorohydrocarbons, alcohols, for example, methanol, ethanol, n- or iso-propanol, ethers, ketones and esters, by way of example, formic acid methyl ester, formic acid ethyl ester, acetic acid methyl ester, or acetic acid ethyl ester, in liquid form, or air, nitrogen and carbon dioxide as gasses.

Suitable as "chemical" foaming agents are, by way of example, isocyanate in a mixture with water, wherein carbon dioxide is released as an effective foaming agent. In addition, carbonates and bicarbonates in a mixture with acids are suitable, which likewise create carbon dioxide. Also suitable are azo compounds, such as azo dicarbonamide.

In a preferred embodiment of the invention, the mixture also contains at least one foaming agent. This foaming agent is present in the mixture in an amount of from 0.5 to 60% by weight, preferably 1 to 40% by weight, especially preferably 1.5 to 30% by weight, based on the melamine-formaldehyde precondensate. Adding a physical foaming agent with a boiling point between 0 and 80° C. is preferred.

In a further embodiment, besides the melamine-formaldehyde precondensate of the foam material to be produced and the nano components, the mixture also contains an emulsifier as well as optionally a hardening agent and optionally a foaming agent.

In a further embodiment, the mixture is free of further additives. For some purposes, however, it can be favorable to add 0.1 to 20% by weight, preferably 0.1 to 10% by weight, based on the melamine-formaldehyde precondensate, of customary additives such as colorants, flame retardants, UV stabilizers, and agents to reduce the toxicity of fumes or to boost carbonization.

It is also possible to add additives to the melamine-formaldehyde precondensate. In one embodiment, the abrasive foam materials contain at least one additive from the group of colorants, aromatic substances, optical brighteners, UV absorbers and pigments. This additive material is preferably distributed homogeneously throughout the foam material.

The established inorganic natural (chalk for, example) or synthetic pigments (for example, titanium oxide) can be used as pigments, but also organic pigments.

The introduction of the foamable reactive resin (step 2) into the substrate material can be accomplished by all of the methods known to the person skilled in the art, by way of example, by impregnating the substrate material with the foamable reactive resin. Alternatively, (the surface of) the substrate material can be sprayed with the foamable reactive resin and optionally subsequently co-extruded or rolled into it (WO-A-2009/077616). Typically, the foamable reactive resin is applied as evenly as possible. The method according to the invention can be carried out in such a way that the substrate material is completely immersed in the impregnating solution containing the foamable reactive resin or only one planar surface of the substrate material is dipped.

In a preferred embodiment, a combination of open celled foam material and a melamine-formaldehyde resin foam can preferably be produced discontinuously.

In this connection, in a foaming apparatus having variable pressure settings, the solution or dispersion containing a precondensate from step (1) can be combined with the substrate material. Various combinations are possible:
1. The substrate material is provided and the foamable reactive resin is applied as evenly as possible.
2. The substrate material is saturated with the foamable reactive resin, and is then given its foam shape.
3. The melamine-formaldehyde resin is produced and the substrate material is then added.

In a further preferred embodiment, a combination of substrate material and melamine-formaldehyde resin foam can preferably be produced in a continuous process.

The combining of substrate material and a melamine-formaldehyde resin can be achieved in various ways. In this connection, the substrate material can be conveyed to the foaming apparatus by means of a conveyor belt. Beforehand, the substrate material can be compressed, so that during foaming with the melamine-formaldehyde resin, the full height of the foam (i.e. the initial thickness of the substrate material) is achieved. Moreover, during the foaming process, the substrate material can be expanded, so that it drags along the foam channel, thus losing its original composite structure.
1. The substrate material can be guided along the base of the foaming apparatus. By way of example, the substrate material can be fixed to the underside of the foaming apparatus by the use of Velcro. The slurry can be applied to the substrate material from above.
2. The substrate material can be guided above the melamine-formaldehyde resin in the foaming apparatus, so that during the foaming up, the melamine-formaldehyde resin can penetrate the substrate material (and expand).
3. The melamine-formaldehyde resin can be sprayed directly into the substrate material and rolled into it. During the rolling, the excess reaction resin can be removed until the desired amount of foamable reaction resin is present in the substrate material.

In production step (3) the precondensate and the substrate material, as the case may be, is/are heated to produce foaming By heating the solution or dispersion from step (2) to a temperature higher than the boiling point of the used foaming agent, a foam material can be obtained. The exact temperature to be used also depends on the foaming agent utilized (on its boiling point, for example). The heating in step (3) can be accomplished, for example, by using hot gasses (such as air or inert gasses) and/or by high frequency radiation (for example, microwaves).

Preferably, the energy input can be produced by electromagnetic radiation, for example, by high frequency radiation with 5 to 400 kW, preferably 5 to 200 kW, especially preferably 9 to 120 kW per kilogram of the mixture used, in a frequency range of from 0.2 to 100 GHz, preferably 0.5 to 10 GHz. Magnetrons are suitable as a source of dielectric radiation, wherein one or more magnetrons can be irradiated simultaneously.

The hybrid foam materials produced are subsequently dried, wherein water and foaming agent remaining in the foam material is removed.

The properties of the hybrid foam produced in this way arise from the foaming melamine-formaldehyde resin used and from the established bulk density of the substrate material.

As a general rule, the melamine resin foam materials produced according to the invention have a density of from 5 to 100 g/l, especially preferably from 10 to 50 g/l.

Moreover, the hybrid foam can also contain additives. Suitable additives are, by way of example, flame retardants such as swelling agents, alkali silicates, melamine, melamine polyphosphate, melamine cyanurate, aluminum hydroxide, magnesium hydroxide, ammonium polyphosphate, organic phosphates or also flame-retarding halogen compounds. Similarly, also suitable as additives are softeners, nucleating agents, IR absorbers such as carbon black and graphite, aluminum oxide powder or $Al(OH)_3$, soluble and insoluble colorants, active biocide substances (such as fungicide) and pigments.

Optionally, the hybrid foam can also be reinforced with additional organic or inorganic components. Such components are preferably introduced in a blend with the foamable reactive resin. Suitable reinforcing fillers are, by way of example, short glass fibers, talcum, chalk or other minerals, nanotubes, layer silicates or carbon fibers. These additives can be previously introduced into the substrate.

In a special embodiment of the process according to the invention, the substrate material containing the foaming reactive resin (hybrid foam) can be deformed by pressure. Temperature deformations of melamine resin foam materials are already known from EP-A-111 860.

A method for producing three-dimensional shaped bodies from open cell flexible thermosetting foam materials, wherein the foam material either a) is exposed to steam for a period of from 0.1 to 120 minutes at a temperature of 100° C. to 180° C. or is boiled with water and subsequently shaped under a pressure of 0.1 to 100 bar at a temperature of from 20° C. to 280° C., or b) is shaped under a pressure of from 1.5 to 15 bar and, subsequently in its shaped state is exposed to steam at a temperature of 100° C. to 180° C. for a period of from 0.1 to 60 minutes.

The terms "pressure shaping" or "pressure shaping step" in the context of the present invention are understood to mean the treatment of the substrate material containing the foaming reactive resin (hybrid foam) at elevated pressures and elevated temperatures. For this purpose, a suitable tool known to the person skilled in the art is used, which is preferably heatable, the shape of which determines the shape imparted to the shaped body to be produced. In this way, for example, by means of what are known as "inserts" or tools with specially shaped surfaces, components (molded components) of the most diverse appearance and/or thicknesses can be produced.

Elevated pressure is understood to mean any pressure greater than atmospheric pressure (1 bar). This step according to the invention is normally carried out in such a way that the obtained substrate material containing the foamable reactive resin is inserted into a suitable form, onto which pressure is applied. In a preferred embodiment of the present invention, the pressure shaping step is carried out at an elevated temperature. In this preferred embodiment, it is referred to as the "thermoform step". In this connection, in principle it holds true that the higher the temperature is adjusted, the shorter the dwell time in the form for the substrate containing the foamable reactive resin.

Advantageously, the pressure shaping is carried out at a temperature of from 50° C. to 200° C. and/or at a pressure of from 2 to 200 bar. Depending on the system used, the finished component can be removed after a few minutes, for example, after 0.5 to 2 minutes. As the case may be, the pressure shaping step can also take place over a longer period of time.

As a rule, the molded components produced with hybrid foam according to present invention are of any size, dimensions and shape, such as stars, spheres, cubes, rectangular solids, rings, cylinders, hollow cylinders, half shells and strands.

The hybrid foams according to the invention are characterized by good yield strength under compression, and good tear propagation resistance, as well as by great and constant plasticity. Moreover, they have a low density and are light weight and exhibit low flammability. The particular advantage of the hybrid foams according to the invention is based on the fact that in a simple way they can assume any desired shape and, at the same time, this shape is very durable.

By means of a pressure shaping step, the thickness of the finished (e.g. planar) molded component is normally smaller or, at a maximum, the same as the thickness of the substrate material used. Preferably, after the pressure shaping, the hybrid foam has a thickness of ≤80% in comparison with the thickness of the substrate material used. In one embodiment of the present invention, the thickness of the finished hybrid foam can be reduced to 10 to 50% of the thickness of the substrate material used.

Additional Material

The additional layer(s) optionally present in the cleaning implements herein, may be of any suitable material other than said modified open-cell. The additional material may be suitable to provide beneficial features to the cleaning implement, such as abrasiveness or increased rigidity or increased grip.

In view thereof, said additional material may be a scouring material or a scouring pad, foam material, a rigid foam material, a handle made of a foam material, thermoplastic material, wood, metal or combinations thereof, and the like.

Second Foam

In a highly preferred embodiment herein, the cleaning implement (1) herein comprises (at least) one layer of a second foam (3).

Suitable second foams for use herein are selected from the group of foams consisting of: polyurethane foams; polypropylene foams; polyethylene foams; cellulose foam sponges; naturally occurring sponges; open-cell polyester foams; and cross-linked polyethylene foams; and combinations thereof.

The thickness of said layer of a second foam if any is preferably up to 30 mm, preferably from 0.5 mm to 20 mm, more preferably from 1 mm to 15 mm, even more preferably from 2 mm to 10 mm, and most preferably from 4 mm to 8 mm. Furthermore, in the preferred embodiment herein, wherein the cleaning implement comprises a layer of second foam the thickness of said hybrid foam (2) layer is preferably from 7 mm to 100 mm, more preferably from 15 mm to 25 mm.

In a preferred embodiment herein, the total volume of said layer of said second foam in the cleaning implement herein is preferably from 10 $cm^3$ to 100 $cm^3$, more preferably from 20 $cm^3$ to 70 $cm^3$, even more preferably from 30 $cm^3$ to 60 $cm^3$, and most preferably from 40 $cm^3$ to 50 $cm^3$.

Packaging Means

The cleaning implement herein may be combined in an article of manufacture with a packaging means.

The packaging means herein may be any suitable means known to package cleaning implements. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning implement.

Method of Cleaning a Hard Surface

In another embodiment the present invention encompasses method of cleaning a hard surface with a cleaning implement as described herein above.

In yet another embodiment herein, the present invention encompasses a method of cleaning a hard surface by bringing a cleaning implement according to the present invention into contact with said hard surface. By "cleaning" it is meant herein removing spots and/or stains from hard surfaces.

In still another embodiment herein, the present invention encompasses a method of cleaning a hard surface with hybrid foam according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning implement or said hybrid foam with an appropriate solvent, preferably tap water, more preferably water in combination with a detergent composition, prior to bringing said cleaning implement into contact with said hard surface.

EXAMPLES

The following examples will further illustrate the present invention. The following Examples are meant to exemplify compositions according to the present invention but are not necessarily used to limit or otherwise define the scope of the present invention.

Example 1

Production of a Foam Material Modified with a Polyester (PET) Nonwoven Fabric 75 parts by weight of a spray dried melamine-formaldehyde precondensate (mol ratio 1:3) was dissolved in 25 parts by weight of water. To this resin solution 3% by weight of formic acid, 2% by weight of Na—C12/C14 alkyl sulfate and 20% by weight pentane were added (based on the weight of the resin).

A polyester nonwoven fabric (density—800 g/m², 25% by weight, based on the resin) was saturated with the aqueous melamine-formaldehyde mixture, then was foamed by means of microwave radiation in a polypropylene mold (for foaming) After the foaming, it was dried for 30 minutes.

The results are summarized in Table 1.

Example 2

Production of a Foam Material Modified with a Reticulated PU Foam Material 75 parts by weight of a spray dried melamine-formaldehyde precondensate (mol ratio 1:3) was dissolved in 25 parts by weight of water. To this resin solution 3% by weight formic acid, 2% by weight of a Na—C12/C14 alkyl sulfate, and 20% by weight pentane were added (based on the weight of the resin).

The aqueous melamine-formaldehyde resin mixture was placed in a polypropylene mold (for foaming), then an open cell PU foam material (density—30 g/l) was placed on the slurry. This was foamed by means of microwave radiation. After the foaming, it was dried for 30 minutes. The results are summarized in Table 1.

Comparison Example A 75 parts by weight of a spray dried melamine-formaldehyde precondensate (mol ratio 1:3) was dissolved in 25 parts by weight of water. To this resin solution 3% by weight formic acid, 2% by weight of a Na—C12/C14 alkyl sulfate, and 20% by weight pentane were added (based on the weight of the resin). This was then stirred and foamed in a polypropylene mold (for foaming) by means of microwave radiation. After the foaming, it was dried for 30 minutes.

The results are summarized in Table 1.

| | Density [g/l] | Compression force values [N/kN] | Tear Propagation Resistance DIN ISO 34-1:04-07 Method B[N] |
|---|---|---|---|
| Example 1 | 13 | 66.7 | 3.48 |
| Example 2 | 39 | 47.2 | 9.02 |
| Comparison Example A | 8 | 34.7 | 2.07 |

Measurement of Compression Force

To evaluate the mechanical performance of the melamine resin foam materials, a measurement of compression force was carried out according to U.S. Pat. No. 4,666,948. In this connection, a cylindrical stamp having a diameter of 8 mm and a height of 10 cm was pressed at an angle of 90° into a cylindrical sample having a diameter of 11 cm and a height of 5 cm until the sample tore. The tear propagation resistance [N/kN] gives information about the performance of the foam material.

Foams and Molded Components from Substrate Materials Containing Foaming Reactive Resins Use of Hybrid Foam According to Present Invention to Clean a Hard Surface A piece of hybrid foam according to present invention is used to clean a hard surface by wetting a piece of said foam with water and thereafter bringing it into contact with the hard surface to be cleaned. The hybrid foam according the present invention shows an excellent performance in removing greasy soap scum and neat kitchen dirt from said hard surface.

Cleaning Implement A

A single layer cleaning implement having a cuboid shape defined by three groups of parallel and equal length sides, referred to as a, b and c, with a being 6.5 cm, b being 12 cm, and c being 3 cm is cut from hybrid foam according to present invention. The overall shape of Cleaning Implement A is similar to the cleaning implement of FIG. 1.

Cleaning Implement A is used to clean hard surfaces. Indeed, Cleaning Implement A is wetted with water and thereafter brought into contact with the hard surface to be cleaned. Cleaning Implement A shows an excellent performance in removing greasy soap scum and neat kitchen dirt from said hard surface.

Cleaning Implement B

A dual layer cleaning implement having a cuboid shape defined by three groups of parallel and equal length sides, referred to as a, b and c, with a being 6.5 cm, b being 12 cm, and c being 4 cm is made by foam flame laminating a first layer of hybrid foam according to present invention, having a thickness—side c—of 2 cm to a second layer of commercially available polyurethane foam, having a thickness—side c—of 1 cm. The two layers are joined together at the plane formed by sides a and b. The overall shape of Cleaning Implement B is similar to the cleaning implement of FIG. 2.

Cleaning Implement B is used to clean hard surfaces. Indeed, Cleaning Implement B is wetted with water and thereafter the hybrid foam side of Cleaning Implement B is brought into contact with the hard surface to be cleaned by rubbing said side over the area to be cleaned. The excessive amount of water is thereafter absorbed by the polyurethane layer of Cleaning Implement B by swiping the cleaned surface with said layer. Cleaning Implement B shows an excellent performance in removing greasy soap scum and neat kitchen dirt from said hard surface.

Cleaning Implement C

A dual layer cleaning implement having a cuboid shape defined by three groups of parallel and equal length sides, referred to as a, b and c, with a being 6.5 cm, b being 12.5 cm, and c being 2.5 cm is made by a permanent adhesive a first layer of hybrid foam according to present invention, having a thickness—side c—of 2 cm to a second layer of commercially available polyurethane foam, having a thickness—side c—of 0.5 cm. The two layers are joined together at the plane formed by sides a and b. The overall shape of Cleaning Implement C is similar to the cleaning implement of FIG. 2.

Cleaning Implement B is used to clean hard surfaces. Indeed, Cleaning Implement C is wetted with water and thereafter the hybrid foam according to present invention side of Cleaning Implement C is brought into contact with the hard surface to be cleaned by rubbing said side over the area to be cleaned. The excessive amount of water is thereafter absorbed by the polyurethane layer of Cleaning Implement C by swiping the cleaned surface with said layer. Cleaning Implement C shows an excellent performance in removing greasy soap scum and neat kitchen dirt from said hard surface.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning implement having a volume from 1 $cm^3$ to 10,000 $cm^3$ and comprises a layer of a hybrid foam wherein said hybrid foam comprises an open cell melamine formaldehyde resin of foamable reactive resins, and a substrate material, wherein said substrate material comprises a non-woven fabric, wherein said foamable reactive resin is applied to said substrate material or said substrate material is saturated with said foamable reactive resin and wherein said cleaning implement additionally comprises a second layer of material, wherein said second layer of material is selected from the group consisting of polyurethane foams; polypropylene foams; and combinations thereof wherein said layer of hybrid foam and said second layer of material are joined by a permanent attachment or a temporary attachment, wherein the substrate material is selected from the group consisting of polyurethane resins, polyester resins, epoxides and mixtures thereof and the weight ratio of substrate material to the foamable resin is from 10% to 20%, by weight.

2. A cleaning implement according to claim 1, wherein said cleaning implement has a thickness of at least 15 mm.

3. A cleaning implement according to claim 2, having a shape selected from the group consisting of: cube shape, rectangular shape, pyramid shape, cylindrical shape, cone shape, pencil eraser shape, cuboid shape, and tetrahedron shape.

4. A cleaning implement according to claim 1, wherein said layers of said hybrid foam and said layer of said second material are joined by an attachment means providing a permanent attachment selected from the group consisting of foam flame laminating the layers together; use of a permanent adhesive; sewing the layers together; needle-punching the layers together; and combinations thereof.

5. A cleaning implement according to claim 1, wherein the thickness of said hybrid foam layer is from about 5 mm to about 100 mm.

6. A cleaning implement according to claim 1, wherein said hybrid foam comprises at least one additive selected from the group consisting of biocides, solids, surfactants, colorants, lubricants, cross-linkers, fragrances, plasticizers, odor scavengers, microcapsules and combinations thereof.

7. A cleaning implement according to claim 6, wherein said solids are abrasive materials, filler materials, or combinations thereof.

8. A method of cleaning a hard surface with a cleaning implement (1) according to claim 1.

9. A cleaning implement according to claim 1 wherein said layer of hybrid foam has less than 4 pores per cm and a pore size of 50 to 300 micrometers.

\* \* \* \* \*